Patented Feb. 6, 1923.

1,444,250

UNITED STATES PATENT OFFICE.

RICHARD KERN AND GEORGES JENNY, OF BASEL, SWITZERLAND, ASSIGNORS TO SWISS FERMENT COMPANY, LTD., OF BASEL, SWITZERLAND.

PREPARATION OF ACTIVE ANIMAL AMYLASE AND PROCESS OF MAKING SAME.

No Drawing.   Application filed November 23, 1921.   Serial No. 517,309.

*To all whom it may concern:*

Be it known that we, RICHARD KERN and GEORGES JENNY, both citizens of the Swiss Republic, and residents of Basel, Switzerland, have invented a new and durable Preparation of Active Animal Amylase and Process of Making Same, of which the following is a full, clear, and exact specification.

Attempts have lately been made to apply for pharmaceutical and technical purposes the amylases obtainable from animal organs. The attempts have been more or less frustrated hitherto by the want of permanence of such preparations, and of the dilute aqueous solutions made from them, so that practical application of them on a large scale has not been practicable.

By the present invention a practically unlimited durability is imparted to the animal amylases by adding in suitable manner in the course of their separation and preparation organic colloids soluble in water, such as gum, gelatine, gummy and gelatinous substances and their degradation products, mucous substances, soluble albumin derivatives, soluble starches and dextrins. These colloidal substances act as protective colloids on the amylase, since they, to a certain degree, encase this and exert a protective influence whereby the gradual inactivation by chemical and physical effects of the ambient room hitherto unavoidable are prevented. In many cases they simultaneously automatically adjust the ion concentration most suitable for the preservation and application of the amylase, which adjustment can obviously be aided by the addition of suitable chemicals in known manner. This protective effect is exhibited both in solution and in solid preparations and is so deeply seated that, for instance, a preparation made in the known manner by drying an amylase solution on an inorganic salt, or on an indifferent absorbing material, retained fully and completely its original amylolytic capacity in presence of a protective colloid during an observation period of 14 months, whereas a similar preparation made in exactly the same manner, but without the protecting colloid, lost already after 2 months at least ⅓rd, and after 8 months 80 per cent. of its amylolytic power, and had therefore become useless. Similarly, a dilute aqueous solution in presence of one of the above-named protective colloids, retained its full activity for an observation period of 3 months and more, whereas the same solution without a colloid, even under favourable temperature conditions, had lost irrecoverably within a few hours the greater part of its activity. By choice of the kind and proportion of the organic protective colloid in question, the most important consideration on practical grounds is the solubility of the colloid in water, so that its protective action may be exerted not only during the manufacture and preservation of the preparation but also during its technical or therapeutical use, that is to say its use in aqueous solution. For certain purposes dry preparations of the animal organs containing amylase, or extracts from these organs, dried on convenient substances, or precipitates containing amylase and extracts of the said organs evaporated at low temperature, in each case with addition of the aforesaid protective colloids, are best suited; for other purposes liquid preparations containing the protective colloids in solution and preserved in a suitable manner are more advantageous.

The following example illustrates the invention:

An active aqueous extract from an animal organ containing amylase (salivary glands, pancreas or the like) is evaporated in a vacuum at the lowest possible temperature to the desired degree of amylase concentration and is brought into the dry form in known manner on an inorganic salt, such as sodium phosphate or sodium sulfate with or without addition of a protective colloid, such as gum arabic; in this operation high temperature is avoided as much as possible.

For enhancing the durability and also to secure a sufficient percentage content of protective colloid for later use in aqueous solution, the preparation prepared as described above, so far as it does not contain sufficient proportion of protective colloid, may be stirred at a moderate temperature, for instance 40° C. with a concentrated solution of a protective colloid, such as gum arabic, until a homogeneous mixture is obtained; it may then be allowed to solidify and dried in a vacuum. The temperature named and the proportions, as well as the kind of materials used and their preparation, are given only by way of example and may be modified according to the intended application of the amylase preparation and to its final form.

What we claim is:

1. The herein described durable preparation of animal amylase, consisting of active animal amylase and an organic protective colloid soluble in water.

2. The herein described durable preparation of animal amylase, consisting of an aqueous extract containing active animal amylase and an organic protective colloid soluble in water in solution in the said extract.

3. The herein described durable preparation of animal amylase, consisting of a dry extract of active animal amylase, each of its particles being coated with an organic protective colloid soluble in water.

4. The herein described process for the manufacture of a durable preparation of animal amylase, consisting in preparing an aqueous extract of active animal amylase from an animal organ and adding to the said extract an organic protective colloid soluble in water.

5. The herein described process for the manufacture of a durable preparation of animal amylase, consisting in preparing an aqueous extract of animal amylase from an animal organ, adding to the said extract an organic protective colloid soluble in water and drying the resulting solution.

6. The herein described process for the manufacture of a durable preparation of animal amylase, consisting in preparing an aqueous extract of animal amylase from an animal organ, evaporating the said extract to dryness, adding to the resulting dry extract a concentrated aqueous solution of an organic protective colloid, stirring the resulting mixture and letting it stand until it solidifies.

7. The herein described process for the manufacture of a durable preparation of animal amylase, consisting in preparing an aqueous extract of an animal amylase from an animal organ, evaporating the said extract to dryness, adding to the resulting dry extract a concentrated aqueous solution of an organic protective colloid, stirring the resulting mixture and evaporating it to dryness.

In witness whereof we have hereunto signed our names this 4th day of November 1921, in the presence of two subscribing witnesses.

RICHARD KERN.
GEORGES JENNY.

Witnesses:
FRIEDA KURZ,
AMAND RITTER.